Jan. 1, 1946.　　　　　R. B. HOFFMAN　　　　　2,391,901
SUPPORTING DEVICE FOR VACUUM TUBES
Filed June 24, 1942
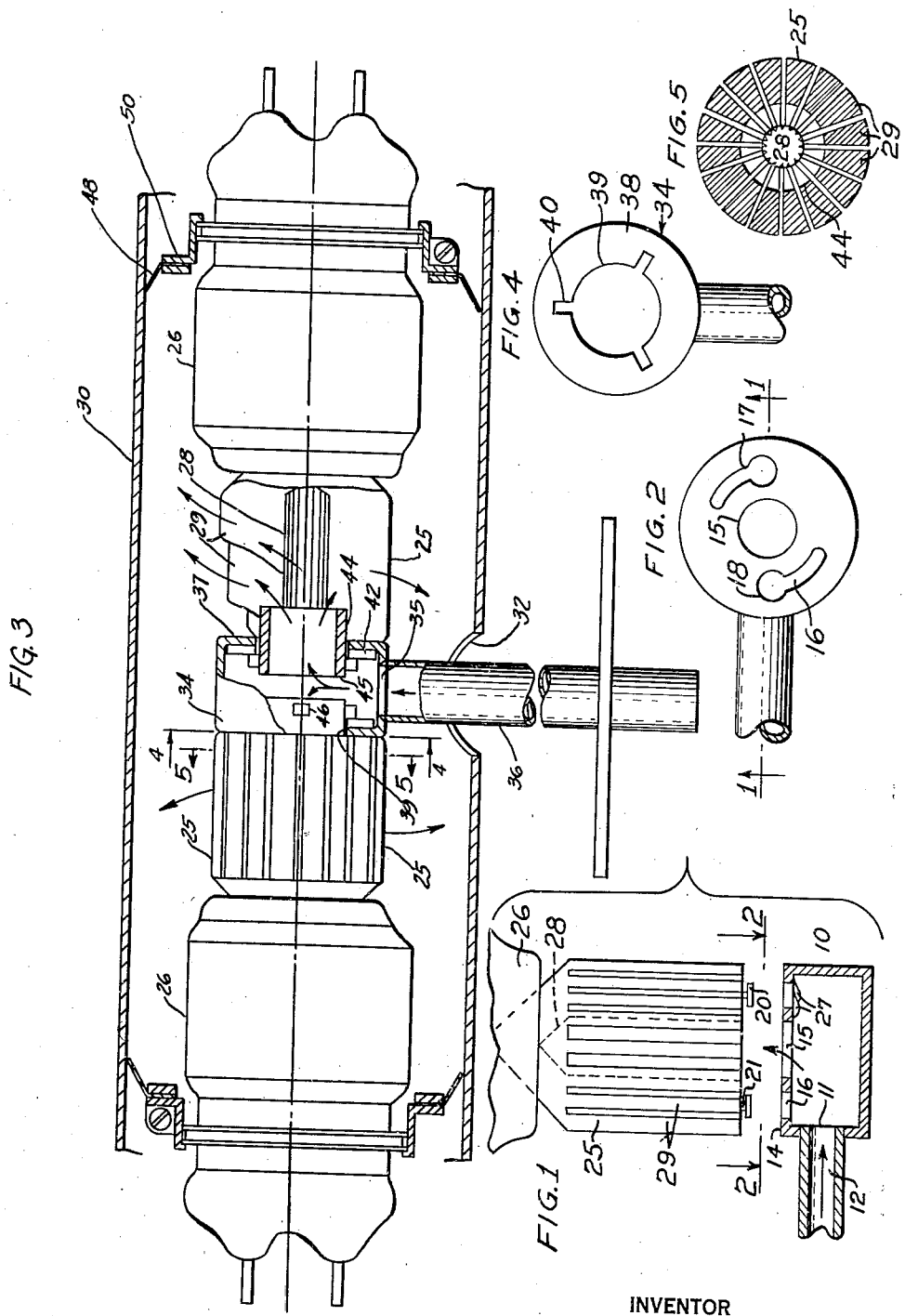
INVENTOR
ROSS B. HOFFMAN
BY 
ATTORNEY Patented Jan. 1, 1946

2,391,901

UNITED STATES PATENT OFFICE 2,391,901

SUPPORTING DEVICE FOR VACUUM TUBES

Ross B. Hoffman, East Orange, N. J., assignor to Federal Telephone and Radio Corporation, a corporation of Delaware Application June 24, 1942, Serial No. 448,248

14 Claims. (Cl. 250—27.5)

This invention relates to vacuum tube supporting or coupling devices and one of the objects of the invention is to provide a tube supporting mount to support one or more vacuum tubes and deliver cooling fluid to the heat radiating structures thereof.

Another object of the invention is to provide a relatively inexpensive and convenient mount to which vacuum tubes may be easily detachably coupled.

Another object of the invention is to provide a heat radiation anode for a power tube with means by which it may be readily coupled electrically and to receive a circulating heat absorbing fluid.

Still another object of the invention is to provide a coupling and fluid cooling device for the power tubes of an amplifier.

My invention is particularly applicable as a means for supporting and/or coupling power tubes having heat radiating fins at the anode portion thereof for electrical conduction and for circulation therewith of a suitable cooling medium such as air and other heat absorbing fluids. The tube coupling device of this invention may comprise a housing having cooling fluid inlet and outlet openings together with coupling means operable upon a turning movement of the tube applied thereto to detachably secure the tube to the housing. The securing means are so disposed that when the tube is properly mounted on the housing the interior of the heat radiating structure of the tube is in communication with the outlet opening of the housing. Various forms of detachable securing means may be provided for securing the tubes to the housing.

In amplifiers such as the push-pull type where the tubes may be arranged in pairs and the anode portions thereof interconnected, I provide an inexpensive coupling device for the tubes whereby the anodes of the two tubes may be detachably secured to oppositely disposed walls of the coupling device. With the tubes thus mounted on the device, cooling fluid may be delivered thereto for passage adjacent heat radiating portions of the anodes.

In addition to the coupling feature of my invention, I provide an outer tubular housing into which the two tubes are inserted, the coupling device being disposed centrally of the tubular housing with an inlet connection extending through an opening in the side wall of the tubular housing. The side wall opening may be chosen large compared to the size of the inlet connection or a separate opening may be provided in the tubular housing to provide an exit passage for the cooling fluid after the fluid has passed through and/or adjacent the anode structures. If desired the space within the tubular housing adjacent the coupling device and the anodes of the tubes may be more or less confined by providing suitable partitioning members between the tubes and the walls of the tubular housing.

For a better understanding of the invention, reference may be had to the following detailed description to be read in connection with the accompanying drawing, in which:

Fig. 1 is a view in vertical elevation of the base or anode portion of a tube together with a vertical sectional view of one form of tube coupling device of this invention taken substantially along line 1—1 of Fig. 2;

Fig. 2 is a plan view of the tube coupling device taken substantially along line 2—2 of Fig. 1;

Fig. 3 is a sectional view of another form of tube coupling device suitable for coupling together a pair of power tubes;

Fig. 4 is a plan view of one of the walls of a tube coupling member of the device taken substantially along line 4—4 of Fig. 3; and Fig. 5 is a vertical sectional view taken along the line 5—5 of Fig. 4.

Referring to Figs. 1 and 2 of the drawing, I have shown one form of the invention, for purposes of illustration, as comprising a circular hollow housing 10 having an inlet opening 11 to which a tubular inlet connection 12 is either made integral or otherwise suitably attached thereto. The upper wall 14 of the housing 10 is provided with an outlet opening 15 and a pair of slots 16 and 17, one end 18 of each slot being enlarged to receive the heads 20 of a pair of lugs 21 projected from the lower end of the anode structure 25 of the power tube 26. When the lugs 21 are received in the enlarged ends 18 of the slots 16 and 17 and the tube revolved about its longitudinal axis, the heads 20 of the lugs are adapted to slide beneath the narrow portions of the slots to detachably lock the tube in position on the housing. Cam shaped flanges 27 may be provided adjacent the slots 16 and 17 to insure a close attachment between the base of the tube and the wall 14 of the housing 10.

The base structures of the type of power tubes 26 shown in Figs. 1 and 3 comprise anodes extending beyond the glass or envelope portion of the tube. The extended portion of the anode of each tube is slotted radially as clearly shown in Fig. 5, dividing it into a plurality of radially extending fins 29. A cylindrical bore 28 (Fig. 3) is formed centrally of the anode structure and is in communication with the radially extending slots.

When the tube is detachably secured to the housing 10 with the lugs 21 in the slots 16 and 17, the bore 28 is disposed in substantial registry with the outlet opening 15 of the housing 10. In this mounted relation, the cooling fluid introduced through the tubular connection 12 flows into the bore 28 and is distributed for flow between the heat radiating fins of the anode structure. By using a tube coupling mount of this invention rapid dissipation of heat is thus insured and a smaller sized tube can be satisfactorily used for a larger power output than heretofore possible.

The diameter of the housing is preferably substantially the same as the diameter of the anode, not only to form an end wall for the slots in the anode structure but also to present a flush surface connection and thereby preserve continuity of the coupled parts and avoid electrical disturbance effects. The connection 12 serves as an electrical connection for the anode as well as a means for introducing a heat absorbing fluid for circulation through the anode structure.

Referring to Figs. 3 and 4 of the drawing, another form of tube coupling device in accordance with this invention is shown. This form is particularly adapted for coupling together a pair of power tubes such as may be used in push-pull amplifiers. The tubes herein illustrated are the same as shown in Fig. 1 except for the lug engaging structure thereof.

The coupling device shown in Fig. 3 comprises a tubular housing 30 having a side opening 32. Centrally disposed within the housing is a coupling member 34 in the shape of a hollow cylindrical housing having an inlet opening 35 to which an inlet tubular connection 36 is suitably attached and extended through the opening 32. The member 34 is of a diameter substantially equal to the diameter of the anode structures 25 of the tubes 26 so as to preserve continuity of the anode surface with respect to the coaxial housing 30. The side walls 37 and 38 of the member 34 are each provided with an outlet opening 39 and radially extending slots 40. The inner surfaces of the walls 37 and 38 may be provided with cam surfaces 42, the purpose of which is hereinafter described.

The outer portion of the bore 28 in the anode structure 25 of each tube is enlarged at 44 to receive and retain by any suitable means a coupling sleeve 45. This sleeve is provided with a plurality of radially extending lugs 46 so that when the tube is received within the housing 30 with the sleeve disposed within the opening 39 of the coupling member 34, and the tube is turned about its longitudinal axis, the lugs 46 of the sleeve engage the cams 42 to detachably secure the tube to the coupling. The anodes of the two tubes being thus coupled together by the device 34, an electrical connection may be made to the tubular connection 36. This form of coupling sleeve 45 and associated housing member 34 may also be used for single tube coupling purposes, and likewise the form shown in Figs. 1 and 2 may be modified for plural tube coupling.

To confine the space within the tubular housing 30 for the flow of cooling fluid through and about the anode structures 25, suitably flexible partitioning elements 48 may be secured to a grid connection 50 of each tube, the elements 48 being annular in shape and adapted to engage the inner surface of the tubular housing 30. A suitable cooling fluid may be supplied through the tubular connection 36 to the interior of the coupling device 34 for distribution between the two tubes, the flow passing into the bores 28 for flow between the fins 29. The cooling fluid is thereafter allowed to circulate about the base portions of the tubes to the exit opening 32.

From the foregoing, it will be clear that I have provided inexpensive and convenient tube coupling mounts whereby power tubes of the heat radiating anode type may be detachably coupled either singly or plurally for electrical circuit conduction and the circulation of a suitable cooling fluid through and about the anode structures thereof. It will also be clear that the tube mounts herein disclosed may also function to support the tubes or that additional means may be provided to support the tubes.

While I have shown and described but two forms of tube coupling devices, I realize that many variations in the construction and application thereof is possible without departing from the invention. It is to be understood, therefore, that the forms herein shown and described are to be regarded as illustrative of the invention only and not as restricting the appended claims.

What I claim is:

1. A mount for fluid cooled vacuum tubes of the type having a recessed anode structure the side walls of which comprise a plurality of heat radiating fins, comprising a housing having fluid inlet and outlet openings, and means to detachably secure said vacuum tube on said mount with the interior of said anode structure in communication with the outlet opening of said housing to provide an electrical connection for the anode and a communicating passage for the circulation therethrough of a cooling fluid.

2. A tube mounting assembly for fluid cooled vacuum tubes of the type having a recessed structure, the side walls of which comprise a plurality of heat radiating fins, comprising a housing having fluid inlet and outlet openings, a vacuum tube and coupling means including lugs carried by said vacuum tube and bayonet slots in a wall of said housing to detachably secure said vacuum tube on said mount with the interior of said vacuum tube in communication with the outlet opening of said housing.

3. A tube mounting assembly for fluid cooled vacuum tubes of the type having a recessed structure, the side walls of which comprise a plurality of heating radiating fins, comprising a housing having fluid inlet and outlet openings, the wall of said housing containing said outlet opening having a slot adjacent thereto, said slot having an enlarged end portion, a vacuum tube, and a lug having an enlarged head carried by said vacuum tube, said lug being receivable in the enlarged end portion of said slot with the enlarged head thereof lockingly engaging the edges of the slot to detachably secure said vacuum tube on said mount with the recess of said vacuum tube in communication with the outlet opening of said housing.

4. A mount for fluid cooled vacuum tubes having a recessed structure the side walls of which comprise a plurality of heat radiating fins, comprising a housing having fluid inlet and outlet openings, the wall of the housing containing the outlet opening having slots extending radially outwardly from said opening, a tubular member defining an inlet to the interior of said structure, and said member having radially disposed lugs receivable in said slots to detachably secure a vacuum tube on said mount with the interior of said structure in communication with the outlet opening of said housing.

5. A mount for fluid cooled vacuum tubes each having an anode structure the side walls of which comprise a plurality of heat radiating fins, comprising a housing having an inlet opening and two side walls each having an outlet opening and a slot, the anode structures of the vacuum tubes each having means defining an inlet and a lug, the latter being receivable in one of the slots of said housing by which each tube is detachably securable to said housing with the inlet of the anode thereof in communication with an outlet in said housing.

6. A fluid cooled vacuum tube having an anode extension recessed for cooperation with a hollow coupling device, the walls of said anode extension having a plurality of heat radiating fins, and said anode extension having coupling means detachably connectable to said coupling device to form therewith an electrical connection for the anode and a communicating passage to the interior of the anode extension for circulation therethrough of a cooling fluid.

7. A fluid cooled vacuum tube having an anode extension recessed for cooperation with a hollow coupling device, a hollow coupling device having lug receiving openings therein, the walls of said anode extension having a plurality of heat radiating fins, a sleeve securable in the recessed portion of said anode extension, said sleeve having lugs so positioned thereon as to be detachably receivable in the coupling device to form therewith an electrical connection for the anode and a communicating passage to the interior of the anode extension for circulation therethrough of a cooling fluid.

8. In an amplifier of the type having a fluid cooled vacuum tube provided with a recessed anode structure, the side walls of which comprise a plurality of heat radiating fins, the combination therewith of a mount for the tube comprising a tubular member surrounding at least the anode structure of the tube, a coupling device for said anode structure comprising a housing having a fluid outlet opening, and means to detachably secure the anode structure to said housing with the interior of the recessed portion of the anode in communication with said outlet opening.

9. In an amplifier of the type having two fluid cooled vacuum tubes each provided with a recessed anode structure, the side walls of which comprise a plurality of heat radiating fins, the combination therewith of a common mount for said tubes comprising a tubular member surrounding at least the anode structures of said tubes, a coupling device for said anode structures comprising a housing having an inlet opening and two side walls each having an outlet opening, and means to detachably secure the anode structures of said tubes to said coupling device with the interior of each structure in communication with one of the outlet openings of the coupling.

10. In an amplifier of the type having two fluid cooled vacuum tubes each provided with a recessed anode structure, the side walls of which comprise a plurality of heat radiating fins, the combination therewith of a common mount for said tubes comprising a tubular member surrounding at least the anode structures of said tubes, a coupling device for said anode structures comprising a housing having an inlet connection and two side walls each having an outlet opening, said tubular member having an opening in the side wall thereof through which said inlet connection extends and for exit of cooling fluid, means closing the space between the tubular member and the sides of each tube, and means to detachably secure the anode structures of said tubes to said coupling device with the interior of the recessed portion of each anode structure in communication with one of the outlet openings of the coupling.

11. A cooling system for vacuum tubes and the like comprising, in combination, a conduit capable of conveying a cooling medium, an outlet box connected to one end of said conduit, said outlet box being formed on one side with a substantially circular opening and a plurality of relatively angularly displaced slots, a vacuum tube, an anode extension projecting from said vacuum tube, said extension being formed with a cylindrical cavity open at one end and a plurality of radially extending through slots communicating with said cavity, the diameter of said cavity being substantially the same size as the diameter of said circular opening in the outlet box, and means for connecting said anode extension to said outlet box comprising lugs positioned about said cavity and projecting from said extension and fitting into the slots in said box so that the cavity in the anode section is in communicating with the opening in said outlet box, said lugs having projecting portions extending beneath the side of the box so that when said anode extension and box are relatively rotated, said projecting portions will engage beneath the side of the box and hold said anode extension and outlet box together.

12. The combination according to claim 11, in which the slots in said outlet box are formed as bayonet slots and the projecting portions on said lugs are formed as enlarged heads cooperating with said bayonet slots.

13. The combination according to claim 11, in which the slots in said box are formed as radial extensions from said circular opening and the projecting portions of said lugs extend radially outwardly from said lugs to cooperate with said radial slots.

14. The combination according to claim 11, in which said outlet box is formed with a substantially circular opening and a plurality of angularly displaced slots on the other side opposite said one side, in combination with a second vacuum tube having an anode extension formed with a cylindrical cavity, through slots and projecting lugs of substantially identical construction with the anode extension on the first tube, and similarly connected to the other side of the outlet box.

ROSS B. HOFFMAN.